July 31, 1962     C. BOTTASSO ETAL     3,047,041
PNEUMATIC TIRE WITH INTEGRAL RIM
Filed Sept. 4, 1959     2 Sheets-Sheet 1

INVENTORS
Carlo Bottasso,
Luigi Amici,
Luigi Maiocchi
BY Stevens, Davis, Miller & Mosher
ATTORNEYS July 31, 1962 C. BOTTASSO ETAL 3,047,041
PNEUMATIC TIRE WITH INTEGRAL RIM
Filed Sept. 4, 1959 2 Sheets-Sheet 2
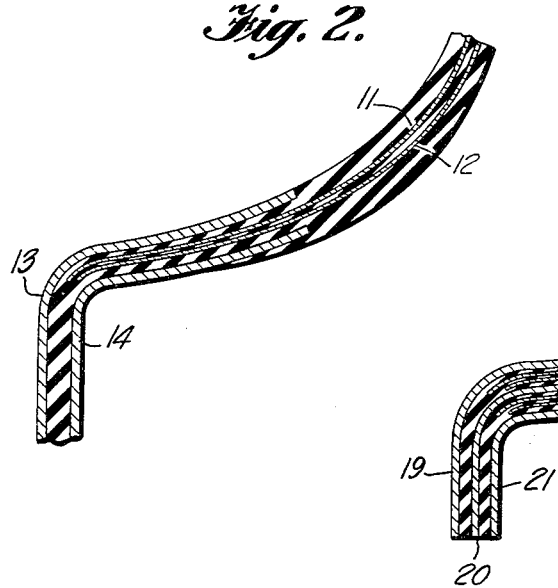
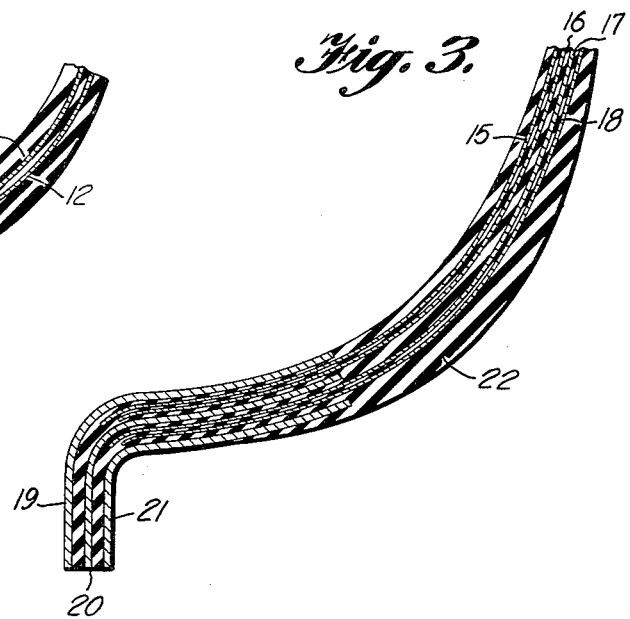
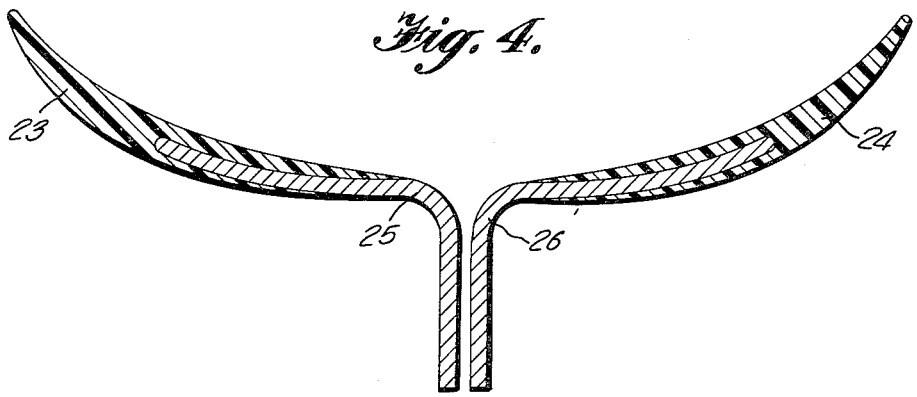
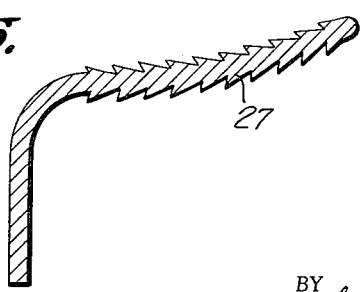
INVENTORS
*Carlo Bottasso,*
*Luigi Amici,*
*Luigi Maiocchi*
BY *Stevens, Davis, Miller & Mosher*
ATTORNEYS

United States Patent Office 3,047,041
Patented July 31, 1962

3,047,041
PNEUMATIC TIRE WITH INTEGRAL RIM
Carlo Bottasso and Luigi Amici, Milan, and Luigi Maiocchi, Moncucco di Vernate, Milan, Italy, assignors to Pirelli S.p.A., Milan, Italy
Filed Sept. 4, 1959, Ser. No. 838,124
Claims priority, application Italy Sept. 6, 1958
4 Claims. (Cl. 152—363)

The present invention relates to a pneumatic tire for vehicle wheels, and more particularly, it concerns a tire in which the ends of the carcass plies, instead of being folded about the metal cores or bead wires, are directly fastened to a specially designed rim which is divided into two halves, the latter being secured by bolts to the wheel web.

In conventional tires, i.e. those provided with a bead zone including inextensible bead wires around which the carcass plies are folded, there are certain disadvantages. For example, assuming that the "strength modulus" is defined as the ratio between the moment of inertia of a given section and the greatest distance from the neutral axis, it can be determined in examining a conventional tire of the type described above, that the strength modulus varies considerably between the zone of the beads (connected to the rim) and the zone of the sidewalls of the tire; moreover, the bending stresses generated in the proximity of the zone of contact between each rim flange and the hollow of the corresponding bead are considerable.

It has been proposed to eliminate some of the disadvantages of the conventional tire by constructing a tire and a corresponding rim where the rim is provided with very low flanges and with conical seats inclined for an angle of about 15° with respect to the rotational axis of the tire. This last arrangement has the effect of supporting the entire bead base in such a manner as to avoid the detrimental bending localized on the rim flanges.

The proposal described above, however, involves considerable technical complications; for example, the excessive stresses to which the bead wires are subjected in service result in the requirement for bead wires of a greater size with, of course, an attendant greater expense.

The purpose of the present invention is to obviate the difficulties described above, for example, by providing a design of tire which is both simple and economical. In the tire of the present invention, the bead zones are devoid of the normal cores or bead wires and are firmly secured to special annular profiles. These annular profiles serve as a substitute for the bead wires previously employed and, at the same time, provide means for securing the tires to the wheel web.

Elastic coverings firmly fastened to the rim or even forming a part of the wheels, as in the particular cases of solid or semi-pneumatic rings of various types, are already known, but these proposals fall beyond the scope of the present invention in view of their different structures and of their limited use in operating at very low speeds.

Also, certain type of tubeless tires are known where the bead zones are shaped in a normal fashion but are devoid of cores or bead wires and, further, where these tires are fastened to the wheel rims as a unitary structure. These tires, as stated above, are necessarily tubeless tires and cannot be examined internally in the case of punctures or other failures; moreover, they do not have the desired graduation of transversal rigidity from the rim to the side walls, and finally are of difficult and in exact construction since the vulcanization must be carried out without a curing bag.

The principal object of the present invention, as stated above, is to provide a pneumatic tire whose carcass is composed of one or more layers of rubberized fabric fastened to special annular profiles joined to the tire during its manufacture and vulcanization. In this way, the tire obtained is very simple in the bead zones, because of the carcass plies are not folded about the cores or bead wires. Since the rim is divided into two parts, this type of tire is suitable for use with an inner tube, but it can also be used without an inner tube both by extending the folds containing at least one ply (preferably the inner ply) along the whole circular inner edge of the annular profile, and/or by inserting a suitable airtight gasket between the profiles.

Moreover, by suitably shaping the profiles and by selecting the proper material, or combination of materials, for making the profiles, it is possible to graduate the deformation of the tire in the bead zone so as to avoid the concentration of bending stresses in a single area.

The tire of the present invention, except as described herein, may be otherwise conventional or it may be of the kind known in the art as a "Cinturato" tire, i.e. a tire having incorporated therein a substantially inextensible reinforcing belt. Moreover, the tire may have an integral or separate tread. In the latter case, the tread can be made in a single piece or it may be formed of a plurality of separate rings.

Other and further objects and advantageous features of the present invention will hereinafter more fully appear in connection with a detailed description of the drawings in which:

FIGURE 2 is a fragmentary cross sectional view showing a modification of the annular profile illustrated in FIGURE 1 in conjunction with a portion of the tire associated therewith;

FIGURE 3 is a view similar to FIGURE 2, showing a still further embodiment of the annular profile and associated tire;

FIGURE 4 is a cross sectional view showing a still further embodiment of the annular profile illustrated in FIGURE 1.

FIGURE 5 is a cross sectional view showing an additional and still further embodiment of the annular profile illustrated in FIGURE 1.

Figure 1:
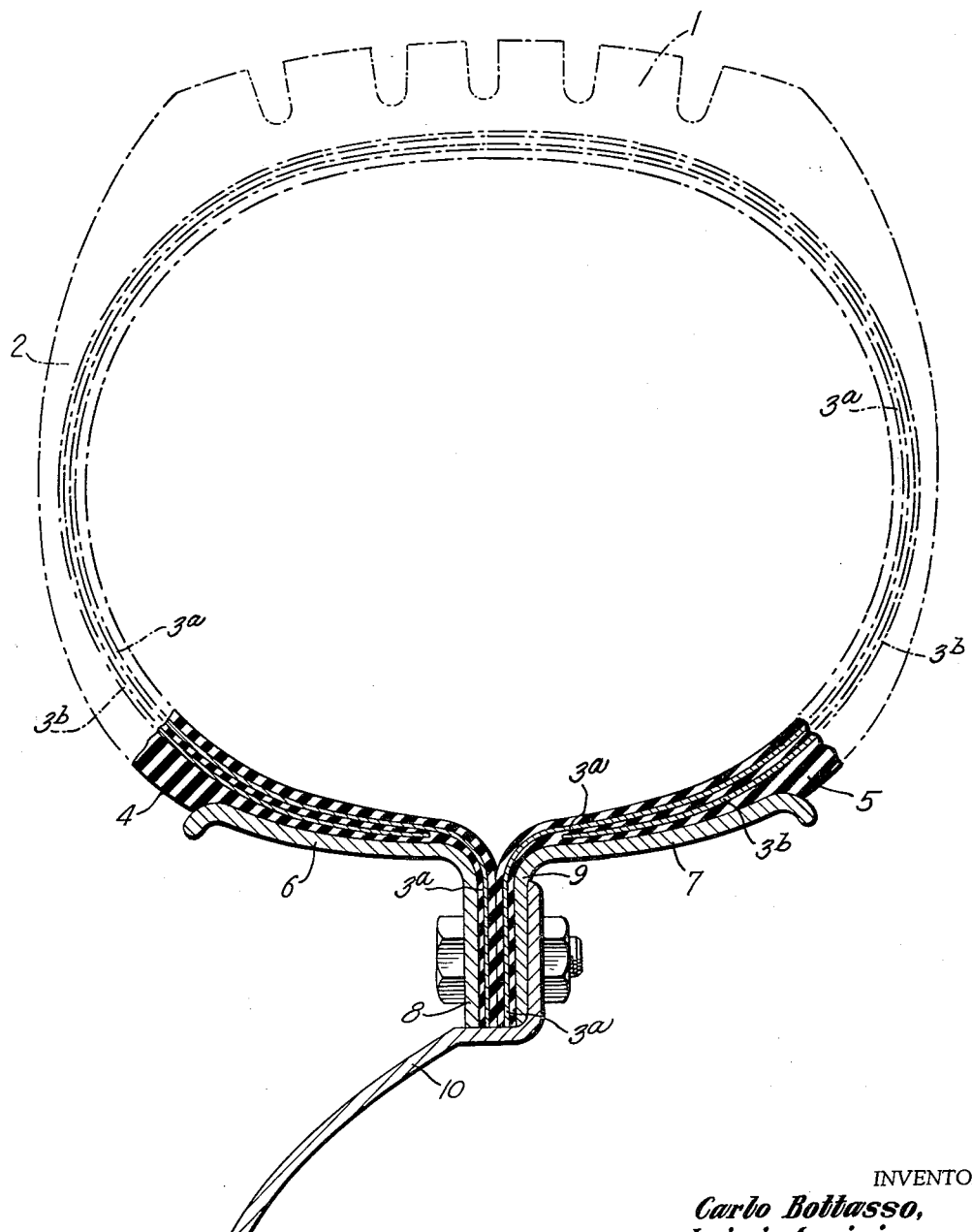
FIGURE 1 is a cross-sectional view, partly in diagrammatic, showing a pnuematic tire of the tubeless type, attached to the annular profiles and fastened on a wheel rim or web.

Referring to the drawings in detail, FIGURE 1 shows a tire having a tread 1, sidewalls 2, and carcass plies 3a and 3b. On the lower extensions of the sidewalls the tire has two bends 4 and 5 which correspond to the beads in a conventional type of tire. (However, it should be noted that the true beads in a conventional tire include metallic cores or bead wires about which the free ends of the carcass plies are suitably folded or turned.) The bends 4 and 5, comprising the ends of the non-folded carcass plies are covered on the outer surfaces with a rubber layer having the same properties as that of the rubber covering the side walls; these bends have, in section, a tapered shape and are firmly anchored each to an outer profile, for example, the bend 4 to the profile 6 and the bend 5 to the profile 7.

These annular profiles, for example, profiles 6 and 7, can be conveniently manufactured by a drawing operation starting from a flat metallic circular crown. As stated heretofore, the assembly of two of these profiles is sufficient to replace the bead cores and the conventional rim, the latter moreover being of a simplified form. In fact, in the embodiment shown in FIGURE 1, the rim flanges are not provided and the annular profiles 6 and 7, each having an approximate L-shape in cross section, are faced on the mid-line of the tire by the circular edges 8 and 9. These circular edges are fastened, for example, by bolts, to the web 10 of the wheel (not shown).

In the embodiment shown in FIGURE 1, the two annular profiles are secured to the outer surfaces of the bends 4 and 5, but they can also be fixed to the inner surfaces of the bends. The anchorage of the material of the tire to the profiles is carried out according to one of the known and conventional methods for bonding rubber to metal, that is, by means of appropriate cements, etc. The bonding may be completed during the subsequent vulcanization of the tire in a conventional manner.

The tire described above, is such as to permit the same to be easily inspected in its inside for possible repairs.

As illustrated in FIGURE 1, purely for the purposes of example, the inner plies 3a extend as far as the inner circular edges of the portions 8 and 9 of the profiles 6 and 7 in order to improve the fastening of the tire to the profiles. This particular arrangement is not indispensable but represents the preferred form of the invention which improves the air-tightness thus rendering it possible to use the tire without an inner tube. Of course, the air-tightness can be further improved by using a suitable gasket between the portions 8 and 9.

As shown in FIGURE 2, the connection between the rim and the tire can be further improved by locking each of the bent portions between two annular profiles. For example, the carcass plies are indicated by the reference characters 11 and 12. These carcass plies together with a rubber layer covering them are fastened between the locking elements or profiles 13 and 14.

The embodiment shown in FIGURE 3 represents a tire designed to support very high loads, such that the tire is built up with a greater number of plies. In order to better distribute the thickness of the plies and, at the same time, to secure an adhesion of the tire to the annular profiles in accordance with the increased stress, the plies 15, 16, 17 and 18 are firmly secured to the profiles 19, 20 and 21 in such a way that the innermost plies 15 and 16 are fastened between the profiles 19 and 20 and the plies 17 and 18 are inserted between the profiles 20 and 21. The rubber layer 22, protecting the plies in the bent zone, is applied to the outermost annular profile 21.

It should be obvious from the above, that the tire forming the object of the present invention can be composed of any number of plies suitably locked between any number of metal profiles; the plies can all be situated in the spaces between the profiles as represented in FIGURE 3 or can be, in part, secured to the outer surface of each group of annular profiles.

As illustrated in FIGURE 4, the tire of the present invention has been designed to obtain a gradual decrease in the transversal rigidity from the metal profiles to the sidewalls so as to avoid localized bending stresses. With this idea in mind, the profiles, in addition to being suitably shaped for this purpose, can also be provided at their ends with extensions formed, for instance, by strips of metal cloth or by semi-rigid fins of suitable material, such as plastic. Therefore, the metallic annular profiles 25 and 26 are provided with semi-rigid fins 23 and 24 which, preferably, are made of a polyammidic material.

FIGURE 5 illustrates an embodiment of the invention which facilitates the fastening of each bend of the tire to the annular profile. This expedient consists in providing each fastening surface of the metallic profile with grip elements as, for example, serrations or indentations 27.

The advantages inherent in the tire of the present invention are many but they may be briefly summarized as follows:

(a) graduation of the deformations of the tire in the zone of the bends 4 and 5;

(b) avoidance of the wearing action of each flange of the rim on the corresponding hollow of the bead;

(c) savings of materials (the cores or bead wires are eliminated and also the rim is simplified by removing the flange);

(d) possibility of manufacturing the annular profiles by drawing flat metallic circular crowns, which is more economical than the construction of the single-piece conventional rims; and (e) simplification of the operations necessary for building up the tire resulting in a greater ease of control and possible automation.

Whereas the present invention has been described in particular relation to the embodiments shown in the drawings, it should be understood that other and further modifications apart from those shown or suggested herein may be made within the spirit and scope of this invention.

What is claimed is:

1. A pneumatic tire of the type having its carcass integral with the rim, characterized in that the carcass has end portions which are, in section, of tapered shape and which contain the ends of the carcass plies, each carcass end portion being permanently fastened to at least one circumferentially continuous metallic annular profile along a complete peripheral surface of contact therewith, said profiles constituting the component elements of a divisible rim and having such a shape as to form supports for the extensions of the ends of the carcass, each carcass end portion being encased between two annular profiles.

2. A pneumatic tire of the type having its carcass integral with the rim, characterized in that the carcass has end portions which are, in section, of tapered shape and which contain the ends of the carcass plies, each carcass end portion being permanently fastened to at least one circumferentially continuous metallic annular profile along a complete peripheral surface of contact therewith, said profiles constituting the component elements of a divisible rim and having such a shape as to form supports for the extensions of the ends of the carcass, the carcass plies in each end portion being subdivided into groups, each group being fastened to one or more annular profiles making part of a group of concentric annular profiles.

3. A pneumatic tire of the type having its carcass integral with the rim, characterized in that the carcass has end portions which are, in section, of tapered shape and which contain the ends of the carcass plies, each carcass end portion being permanently fastened to at least one circumferentially continuous metallic annular profile along a complete peripheral surface of contact therewith, said profiles constituting the component elements of a divisible rim and having such a shape as to form supports for the extensions of the ends of the carcass, said profiles being provided with axially extending outer portions which have extensions less rigid than said axially extending outer portions.

4. A pneumatic tire of the type having its carcass integral with the rim, characterized in that the carcass has end portions which are, in section, of tapered shape and which contain the ends of the carcass plies, each carcass end portion being permanently fastened to at least one circumferentially continuous metallic annular profile along a complete peripheral surface of contact therewith, said profiles constituting the component elements of a divisible rim and having such a shape as to form supports for the extensions of the ends of the carcass, the annular profiles being indented in their portions fastened to the carcass end portions.

References Cited in the file of this patent

UNITED STATES PATENTS

| | | |
|---|---|---|
| 1,035,424 | Rice | Aug. 18, 1912 |
| 2,027,739 | Ledwinka | Jan. 14, 1936 |

FOREIGN PATENTS

| | | |
|---|---|---|
| 405,790 | Great Britain | Feb. 15, 1934 |
| 533,052 | Great Britain | Feb. 5, 1941 |